(12) United States Patent
Chriki et al.

(10) Patent No.: US 12,674,987 B2
(45) Date of Patent: **\*Jul. 7, 2026**

(54) MULTI-LAYER COATING STRUCTURE TO MINIMIZE PHASE SHIFTS, METHOD OF MANUFACTURE, WAVEGUIDE AND HEAD MOUNT DISPLAY

(71) Applicant: LUMUS LTD., Ness Ziona (IL)

(72) Inventors: Ronen Chriki, Lod (IL); Elad Sharlin, Ness Ziona (IL)

(73) Assignee: LUMUS LTD., Ness Ziona (IL)

( * ) Notice: Subject to any disclaimer, the term of this patent is extended or adjusted under 35 U.S.C. 154(b) by 0 days.

This patent is subject to a terminal disclaimer.

(21) Appl. No.: 19/045,869

(22) Filed: Feb. 5, 2025

(65) Prior Publication Data

US 2025/0180909 A1      Jun. 5, 2025

Related U.S. Application Data

(63) Continuation of application No. 18/882,303, filed on Sep. 11, 2024, now Pat. No. 12,449,664, which is a continuation of application No. 18/072,980, filed on Dec. 1, 2022, now abandoned.

(51) Int. Cl.
*G02B 27/01* (2006.01)
*G02B 3/08* (2006.01)
*G02B 6/00* (2006.01)
*G02B 27/14* (2006.01)
*G02F 1/1335* (2006.01)

(52) U.S. Cl.
CPC ........... *G02B 27/0172* (2013.01); *G02B 3/08* (2013.01); *G02F 1/133536* (2013.01)

(58) Field of Classification Search
CPC .. G02B 27/0172; G02B 3/08; G02F 1/133536
See application file for complete search history.

(56) References Cited

U.S. PATENT DOCUMENTS

| | | | | |
|---|---|---|---|---|
| 11,092,874 | B1 * | 8/2021 | Zhang | G02F 1/3544 |
| 12,449,664 | B2 * | 10/2025 | Chriki | G02F 1/133536 |
| 2022/0269120 | A1 * | 8/2022 | Song | G02F 1/133633 |

\* cited by examiner

*Primary Examiner* — Lixi C Simpson
(74) *Attorney, Agent, or Firm* — Scully, Scott, Murphy & Presser P.C.

(57) ABSTRACT

An apparatus includes a waveguide and one or more partially reflective surfaces embedded inside the waveguide, wherein each of the one or more partially reflective surfaces includes a multi-layer coating structure, wherein a first portion of the multi-layer coating structure induces an overall phase shift of light propagating through the first portion of the multi-layer coating structure and wherein a second portion of the multi-layer coating structure is selected to decrease the overall phase shift.

21 Claims, 12 Drawing Sheets

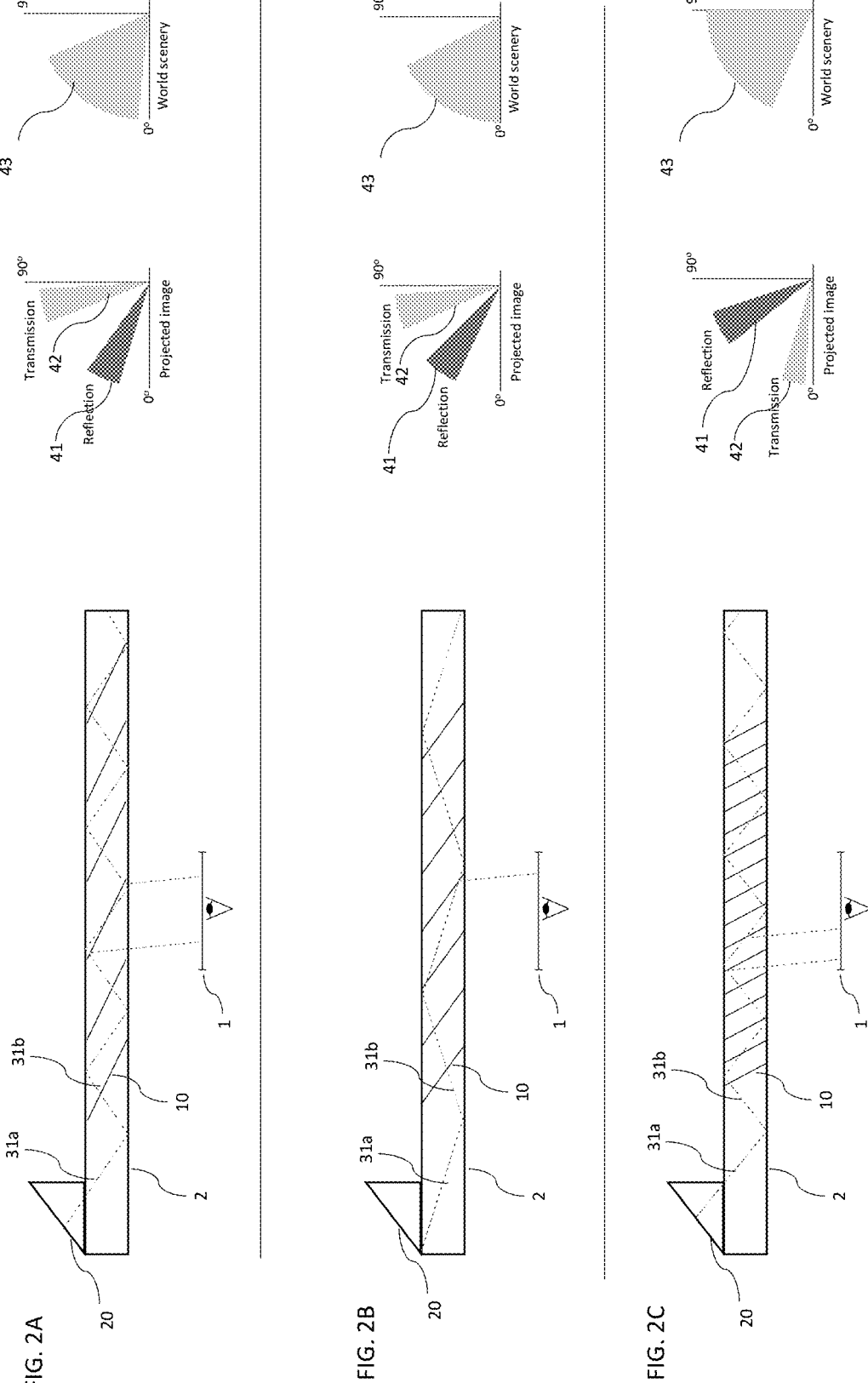

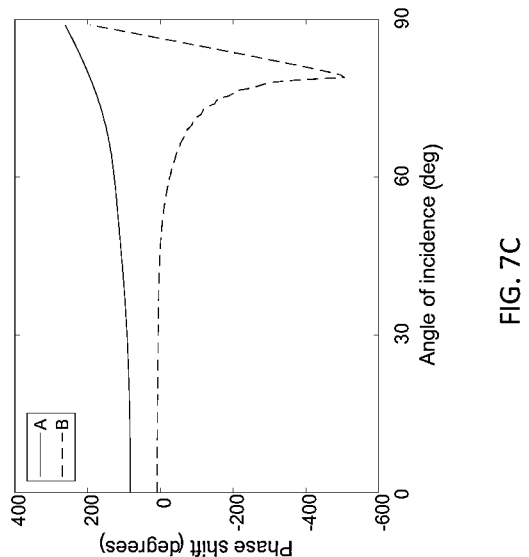
FIG. 7C
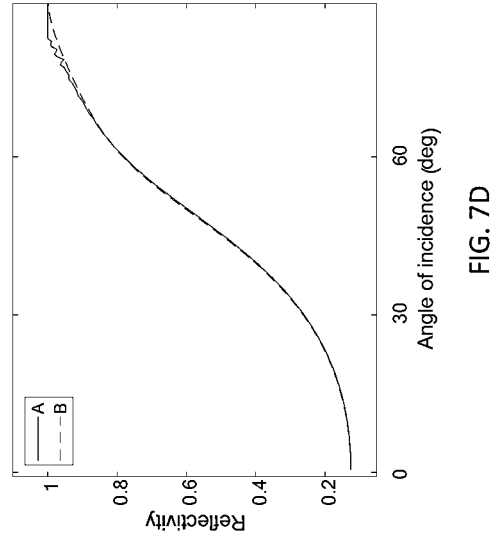
FIG. 7D
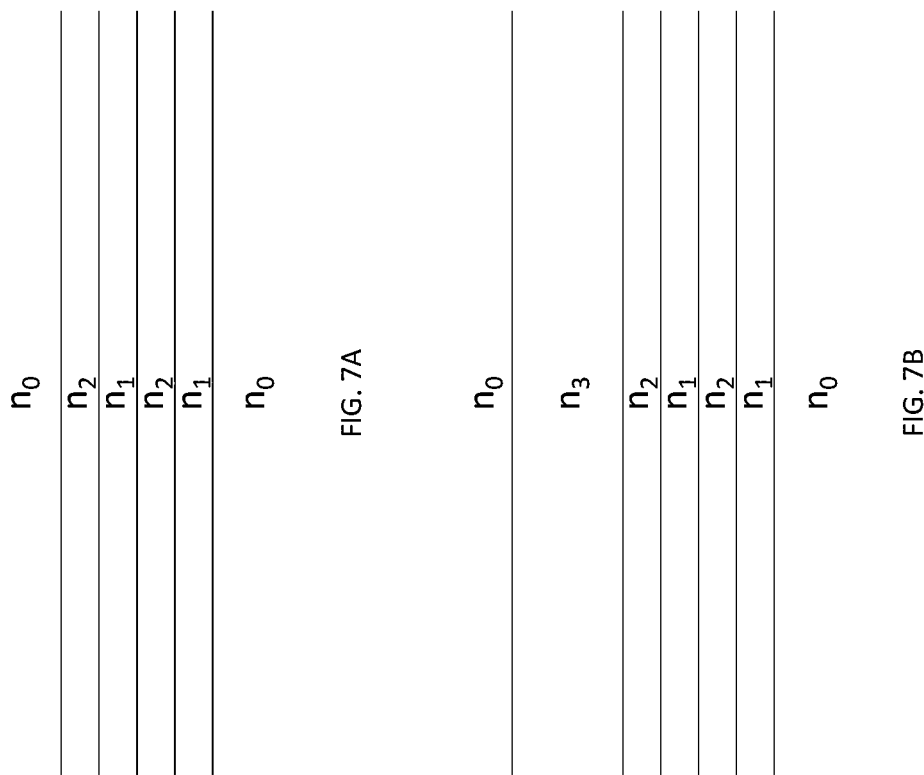
$n_0$
$n_2$
$n_1$
$n_2$
$n_1$
$n_0$
FIG. 7A
$n_0$
$n_3$
$n_2$
$n_1$
$n_2$
$n_1$
$n_0$
FIG. 7B $n_0$ $n_{23}$ $n_{21}$ $n_{22}$ $n_{23}$ $n_0$

Coating B

Coating A

MULTI-LAYER COATING STRUCTURE TO MINIMIZE PHASE SHIFTS, METHOD OF MANUFACTURE, WAVEGUIDE AND HEAD MOUNT DISPLAY

CROSS-REFERENCE TO RELATED APPLICATION

This application is a continuation of U.S. patent application Ser. No. 18/882,303, filed on Sep. 11, 2024, which is a continuation of U.S. patent application Ser. No. 18/072,980, filed on Dec. 1, 2022, the entire disclosures of which are incorporated herein by reference.

BACKGROUND

Refractive head mount displays are based on partially reflective surfaces that are embedded inside a waveguide. These partially reflective surfaces can be made by very accurate nanometric multi-layer coating structures that are designed and manufactured to attain specific reflection, polarization and color characteristics.

The present disclosure relates to a multi-layer coating structure, a method of manufacture, a waveguide and a head mount display. More specifically, the present disclosure relates in some embodiments to a multi-layer coating structure, a method of manufacture, a waveguide and a head mount display having a specific and/or minimized accumulated relative phase through the multi-layer coating structure.

As light propagates in a medium or in free space it accumulates phase. Light propagating a certain distance through different materials would accumulate different phases. As a result, different regions of light beams propagating through complex structures, accumulate different phases, thereby affecting the phase front of the beam and consequently affecting the beam quality in the far field image and reducing the optical resolution of the image.

The present disclosure focuses on refractive waveguides, but may be of relevance to volume grating or surface grating waveguides as well. The techniques described in the present disclosure can also be applied to control the phase front of an expanded output beam, for instance, to generate a beam homogenizer, optical diffuser or an expanded flat-top beam. The advantage of such structures is that they are transparent and can be made to only weakly distort light propagating through them in transmission, while expanding an injected input beam (thereby compactly replacing cumbersome classical optical elements and propagation distances) and generating a diffused light field or a light field with a designed complex phase front.

SUMMARY

In an embodiment, an apparatus is disclosed that comprises a waveguide and one or more partially reflective surfaces embedded inside the waveguide, wherein each of the one or more partially reflective surfaces comprises a multi-layer coating structure, wherein a first portion of the multi-layer coating structure induces an overall phase shift of light propagating through the first portion of the multi-layer coating structure, and wherein a second portion of the multi-layer coating structure is selected to decrease the overall phase shift.

In another embodiment, a method of manufacturing a waveguide is disclosed, where the method comprises providing one or more partially reflective surfaces embedded inside the waveguide, wherein each of the one or more partially reflective surfaces is provided by forming a multi-layer coating structure, wherein a first portion of the multi-layer coating structure is provided to induce an overall phase shift of light propagating through the first portion of the multi-layer coating structure, and wherein a second portion of the multi-layer coating structure is selected to decrease the overall phase shift.

In another embodiment, a non-transitory computer-readable storage medium storing instructions for designing one or more partially reflective surfaces embedded inside a waveguide is disclosed, where the instructions cause one or more processors to at least perform designing a multi-layer coating structure for each of the one or more partially reflective surfaces, wherein a first portion of the multi-layer coating structure is provided to induce an overall phase shift of light propagating through the first portion of the multi-layer coating structure, and wherein a second portion of the multi-layer coating structure is selected to decrease the overall phase shift.

In another embodiment, an apparatus is disclosed that comprises a waveguide and one or more partially reflective surfaces embedded inside the waveguide, wherein each of the one or more partially reflective surfaces comprises a multi-layer coating structure, and wherein one or more layers of the multi-layer coating structure are selected to limit an overall phase shift of light propagating through one or more other layers of the multi-layer coating structure to below a predetermined threshold.

In another embodiment, a non-transitory computer-readable storage medium storing instructions for designing one or more partially reflective surfaces embedded inside a waveguide is disclosed, where the instructions cause one or more processors to at least perform designing a multi-layer coating structure for each of the one or more partially reflective surfaces, wherein each of the one or more partially reflective surfaces comprises a multi-layer coating structure, and wherein one or more layers of the multi-layer coating structure are selected to limit an overall phase shift of light propagating through one or more other layers of the multi-layer coating structure to below a predetermined threshold.

BRIEF DESCRIPTION OF THE DRAWINGS

FIGS. 2A-2C show different angular regimes for the design of a waveguide according to an embodiment of the disclosure.

FIG. 7A shows a coating structure of four layers and two materials of two refractive indices that is placed in an ambient material.

FIG. 7B shows the same structure as shown in FIG. 7A but with an additional thick layer of a refractive index which is close in value to the refractive index of the ambient material.

FIG. 7C shows phase differences between light propagating through a coating and light that would be transmitted in the ambient material without going through the coating, as a function of incident angle for the structures in FIGS. 7A and 7B.

FIG. 7D shows a comparison of reflectivity as a function of incident angle for the two cases presented in FIGS. 7A and 7B.

FIG. 8A shows an exemplary coating structure of two materials of two refractive indices, placed inside an ambient material, where the coating structure is designed for specific requirements that do not include the requirement for low phase shift.

FIG. 8B shows an exemplary coating structure of three materials of three refractive indices, placed inside an ambient material, where the coating structure is designed to have low reflectivity and to induce phase differences that compensate for the phase difference of the coating structure in FIG. 8A.

FIG. 8C shows a combined structure where the coating structure of FIG. 8B is placed on top of the coating structure of FIG. 8A.

FIG. 9 is a multi-layer coating structure with different refractive indices placed in an ambient material, where the structure is designed by a dedicated software to meet all specification requirements, including low phase shift.

DETAILED DESCRIPTION

Phase Shifts Induced by Thin Film Coatings Inside Waveguide

Figure 1A:
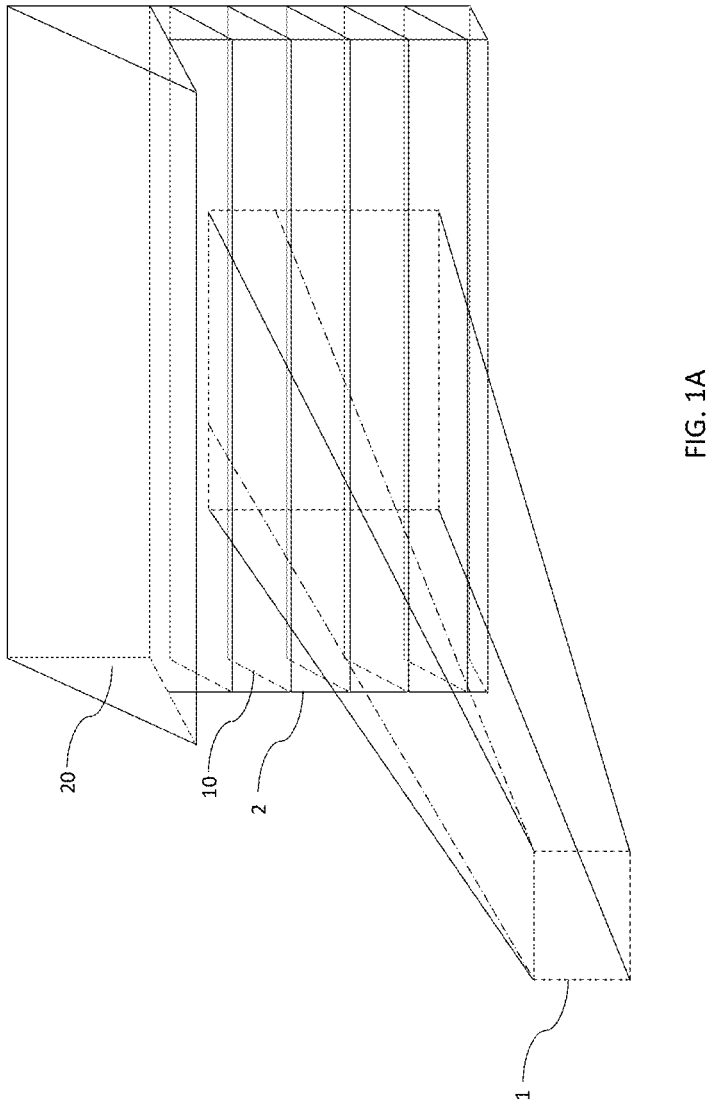
FIG. 1A shows a refractive waveguide with one set of partially reflective surfaces embedded inside the waveguide according to an embodiment of the disclosure.
Figure 1B:
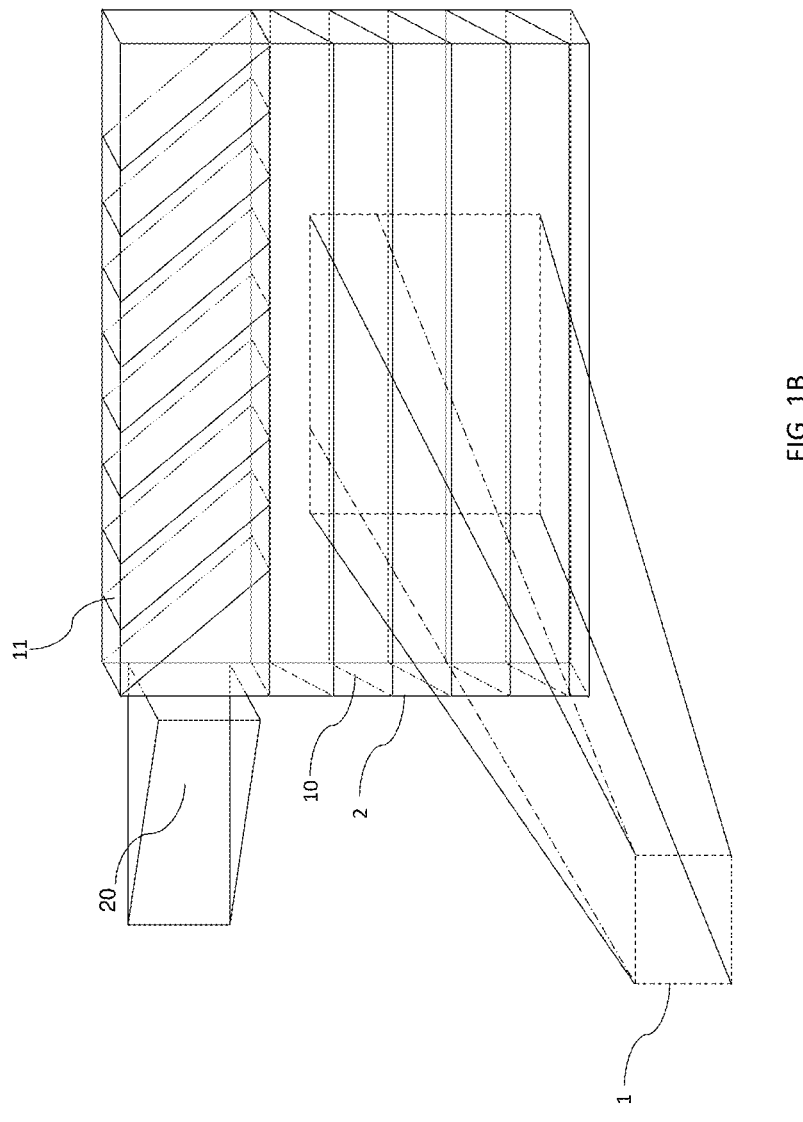
FIG. 1B shows another exemplary refractive waveguide with two sets of partially reflective surfaces embedded inside the waveguide according to an embodiment of the disclosure.

FIG. 1A shows an exemplary refractive waveguide 2 with one set of partially reflective surfaces (facets) 10 embedded inside waveguide 2. FIG. 1B shows another exemplary refractive waveguide 2 with two sets of partially reflective surfaces (facets) 10, 11 embedded inside waveguide 2. The partially reflective surfaces of each set of partially reflective surfaces can be co-parallel. More complicated structures (such as three sets of co-parallels surfaces or more, homogenizing elements, four-fold rectangular waveguide) are also possible. An image can be injected into waveguide 2 through a coupling-in element 20 (that may be refractive, reflective or diffractive) into waveguide 2 or directly through a major surface. The injected image propagates inside waveguide 2 until it is reflected by partially reflective surfaces 10, that couple the light out of waveguide 2 and towards a predetermined eye motion box (EMB) 1, where it is assumed the user's eye is located.

FIGS. 2A-2C show different angular regimes for the design of the set of partially reflective surfaces (facets) 10 in waveguide 2. Although waveguides with only one set of facets is presented, as in FIG. 1A, these regimes are true also for refractive waveguides with several groups of co-parallel facets, such as those in FIG. 1B, for example. Waveguide 2 of FIG. 1A is presented in the left column of each of FIGS. 2A-2C with a different angular orientation of a first set of facets 10. An input image is injected from a projector (not shown) through a coupling-in element 20, and propagates inside waveguide 2 in descending or ascending rays, 31a or 31b, respectively. Eventually, ascending ray 31b is reflected from one of facets 10, and reaches EMB 1. Descending ray 31a may also be reflected by facets 10, however this reflection is unwanted, and would result in reduced output intensity (loss of efficiency) and possibly also in deleterious ghost images.

To minimize these effects, the reflectivity of facets 10 should be made to minimize reflections of descending rays 31a. Therefore, each facet 10 has a range of incident angles in which reflections are desired and that dictate the properties of the output image, and a different angular range of incident angles in which reflections should be minimized. To prevent deterioration of the color uniformity in the final image, the transmittivity of ray 31a and the reflectivity and transmittivity of ray 31b must be sufficiently uniform over the relevant wavelength bands. Clearly, these properties must be controlled over the relevant polarization states of incident rays 31a and 31b.

The middle column of each of FIGS. 2A-2C describes the range of possible incident angles of descending rays 31a and ascending rays 31b on facets 10. Descending rays 31a impinge facets 10 at a certain angular regime 42 (transmissive window), and ascending rays 31b impinge facets 10 at a different angular regime 41 (reflective window). The orientation of facets 10 also determines an angular regime 43 of incident light rays that are transmitted by waveguide 2 from the general world scenery, as described in the right column of each of FIGS. 2A-2C.

FIG. 2A shows facets 10 that are typically at angles of, for example, 23-29° as compared to the major surfaces of waveguide 2. These result in typical angular regimes of, for example, 18-34° for reflective window 41, of, for example, 64-90° for transmissive window 42 and of, for example, 5-63° for window of the world scenery 43.

FIG. 2B shows facets 10 that are typically at angles of, for example, 31-43° as compared to the major surface of waveguide 2. These result in typical angular regimes of, for example, 26-38° for reflective window 41, of, for example, 46-90° for transmissive window 42 and of, for example, 1-69° for window of the world scenery 43.

FIG. 2C shows facets 10 that are typically at angles of, for example, 47-68° as compared to the major surface of waveguide 2. These result in typical angular regimes of, for example, 42-72° for reflective window 41, of, for example, 19-44° for transmissive window 42 and of, for example, 30-90° for window of the world scenery 43.

Figure 3:
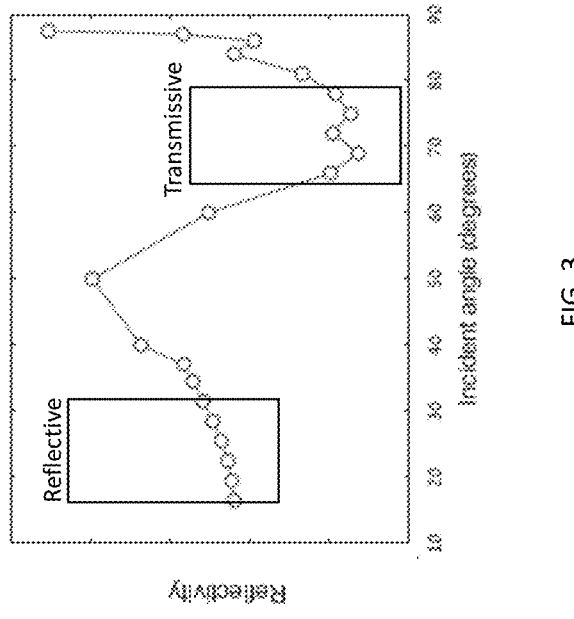
FIG. 3 demonstrates a typical profile of average reflectivity (averaged over the visible spectrum) as a function of incident angle of reflective surfaces of a waveguide shown in FIG. 2A according to an embodiment of the disclosure.

As explained above, within these angular ranges, the multi-layer coating structure design must be optimized to satisfy different optical properties, such as: reflection and transmission, chromaticity and polarization. For example, FIG. 3 demonstrates a typical profile of average reflectivity of s-polarized light (averaged over the visible spectrum, 400-700 nm) as a function of incident angle, for the reflective surfaces 10 of waveguide 2 shown in FIG. 2A. As evident, the reflectivity reaches a desired finite value in the range of low angles ("Reflective" window) and has low reflectivities at high angles ("Transmissive" window).

In addition to these properties of light that are controlled in the multi-layer coating structure design, the present disclosure describes a method to control the phase properties of the transmitted light through the multi-layer coating structures, so as to minimize diffraction artifacts. More specifically, the present disclosure describes a method to control the phase induced by a coating, such that the phase difference between rays that propagate through a coating and rays that propagate in a medium and do not propagate through the coating is limited to some threshold value, or that the phase differences between ascending and descending rays propagating through the coating is limited to some threshold value. For example, the method described herein can control the phase induced by the coating such that the phase difference between rays that propagate through the coating and rays that propagate in the medium and do not propagate through the coating is limited to a predetermined threshold such as within ±1°, within ±10°, within ±50° or within ±100°. Further, for example, the method described herein can limit the phase differences between ascending and descending rays propagating through the coating to a predetermined threshold such as within ±1°, within ±10°, within ±50° or within ±100°.

Figures 4A, 4B, 4C:
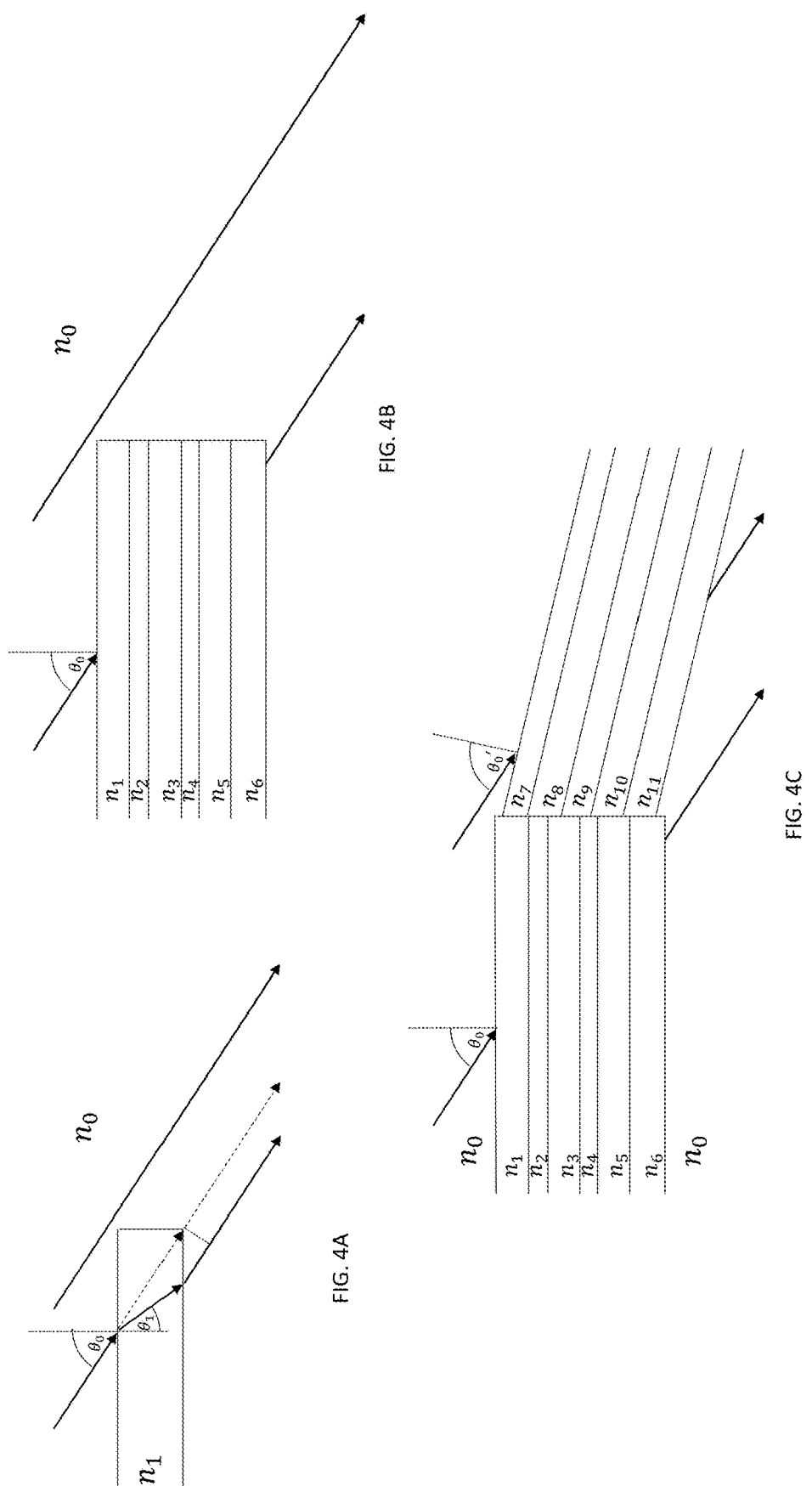
FIG. 4A shows a case of a simple finite slab of thickness d and refractive index $n_1$ placed in an ambient material of refractive index $n_0$, and parallel rays (plane wave) that propagate at angular orientation $\theta_0$ with relation to the norm to the major surface of the slab.
FIG. 4B shows coating structures with multiple layers that induce a difference in accumulated phase between light propagating through the multi-layer coating structure and light that does not propagate through the multi-layer coating structure.
FIG. 4C shows two multi-layer coating structures where light can propagate through two multi-layer coating structures at incident angles $\theta_0$ and $\theta_0'$.

To understand this intuitively, consider the case of a simple finite slab of thickness d and refractive index $n_1$ placed in an ambient material of refractive index $n_0$, and parallel rays (plane wave) that propagate at angular orientation $\theta_0$ with relation to the norm to the major surface of the slab, as shown in FIG. 4A. Rays propagating through the slab are refracted to angle $$\theta_1 = \sin^{-1}\left(\frac{n_0}{n_1}\sin(\theta_0)\right),$$

and propagate through a medium of different refractive index than the surrounding ambient medium. Consequently, the optical path length of rays propagating through the slab is different than the optical path of light rays that do not propagate through the slab. Specifically, the difference in optical path length between rays propagating through the slab and rays that do not propagate through the slab is $$\Delta = \frac{dn_0}{\cos(\theta_0)} - \frac{dn_1}{\cos(\theta_1)} - d\,n_0\sin(\theta_0)\left[\tan(\theta_0) - \tan(\theta_1)\right].$$

Consequently, there is a difference in phase of $\Delta\cdot k$, k being the wavenumber ($k=2\pi/\lambda$, $\lambda$ being the wavelength), between rays propagating through the slab and rays that do not propagate through the slab. At normal incidence, $\Delta=d(n_0-n1)$, and the difference in phase depends linearly on the difference in refractive indices.

Similarly, more complicated multi-layer coating structures with multiple layers, as shown in FIG. 4B, would also induce a difference in phase between light propagating through the multi-layer coating structure and light that does not propagate through the multi-layer coating structure. This phase difference can be calculated by various analytic or numeric methods, e.g., the transfer matrix method. The phase difference may also be calculated for cases where light can propagate through one of two multi-layer coating structures at incident angles $\theta_0$ and $\theta_0'$, as shown in FIG. 4C. Indeed, the ascending and descending rays of a single collimated beam that propagates in waveguide 2 (FIGS. 2A-2C), accumulate different phases when propagating through facet 10.

Figure 5A:
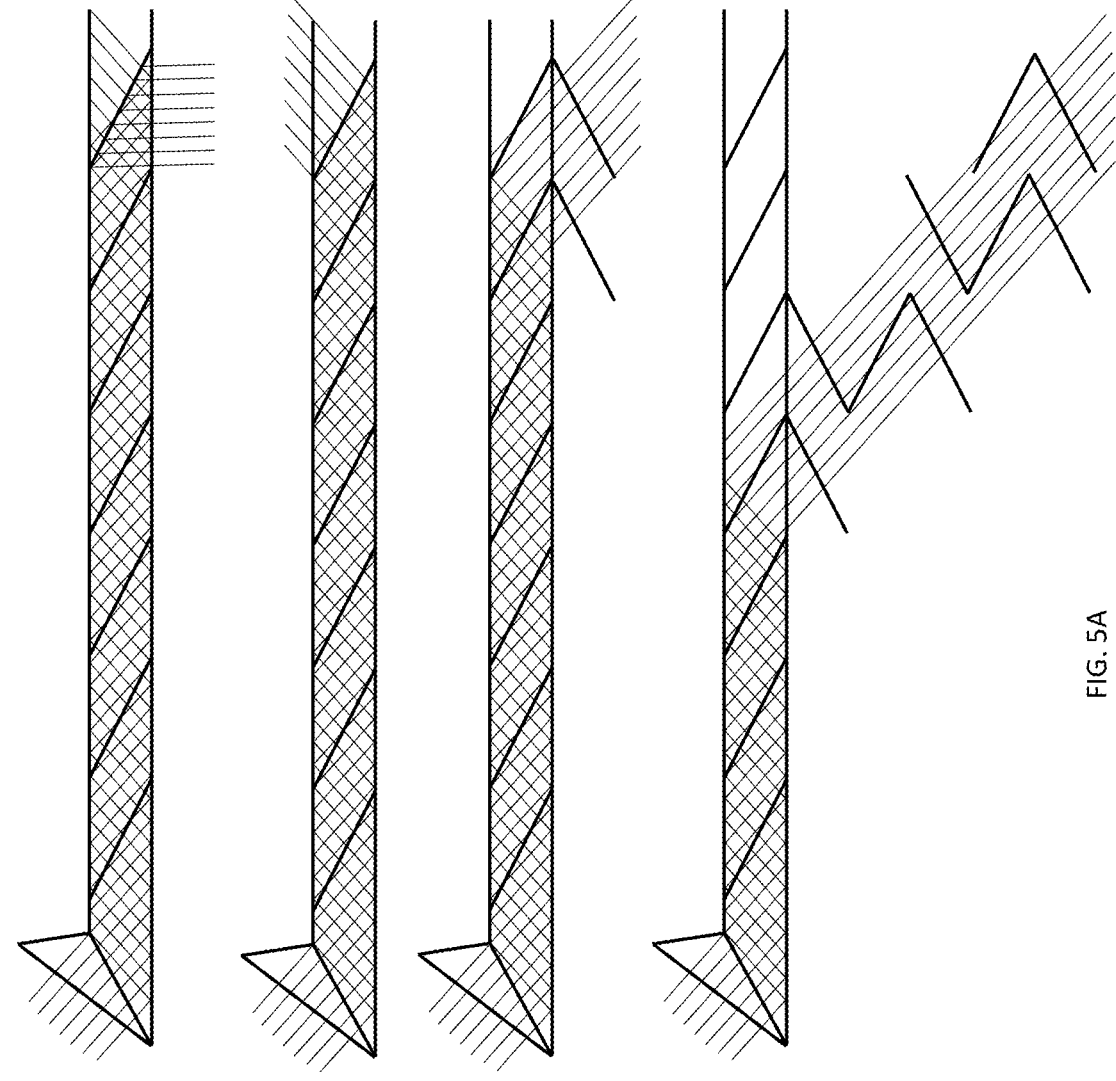
FIG. 5A shows 'unfolding' of an optical path of light rays inside a refractive waveguide.
Figure 5B:
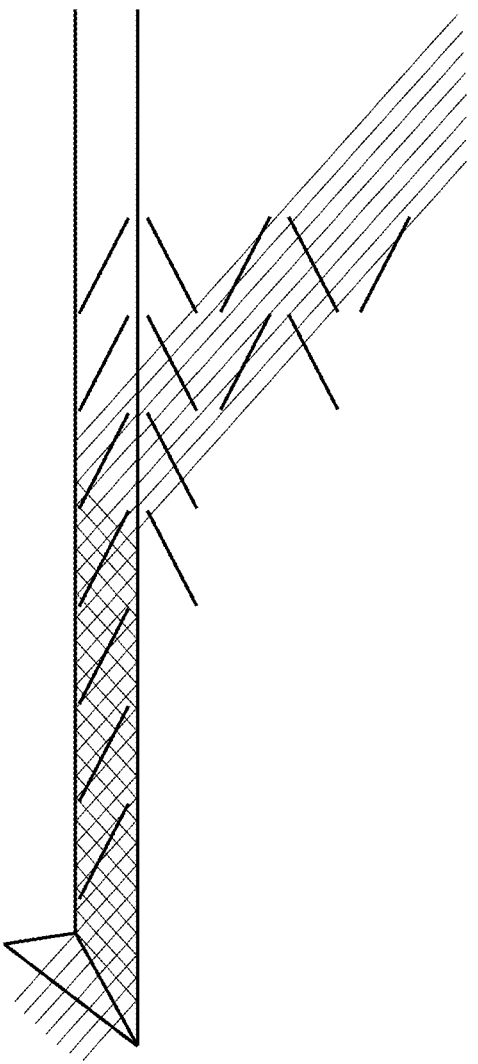
FIG. 5B shows an 'unfolded' optical path of light rays inside a refractive waveguide with facets that do not reach all the way until the major surfaces of the waveguide.

Next, consider FIG. 5A, which shows the optical path of light rays inside a refractive waveguide 2 (also referred to herein as a light-guide optical element (LOE). The first row in FIG. 5A shows a typical 1D structure, where an image is coupled into waveguide 2, and ascending and descending rays 31a and 31b propagate through waveguide 2, until they are reflected by one of the embedded facets 10 and coupled out of waveguide 2. The trajectory of the different light rays is more easily understood by unfolding the light rays around the major surfaces of waveguide 2, where light is reflected by total internal reflection. This is described in the second to fourth rows in FIG. 5A. As evident, different rays impinge facets 10 a different number of times and at different angles (i.e., either as ascending or as descending rays). As a result, rays may differ from one another in amplitude in phase. Similarly, in cases where facets 10 do not reach all the way until the major surfaces, as shown in FIG. 5B, the requirements of phase difference would now include also differences between light propagating in between coatings and light propagating through the coatings at different angles.

Figure 6:
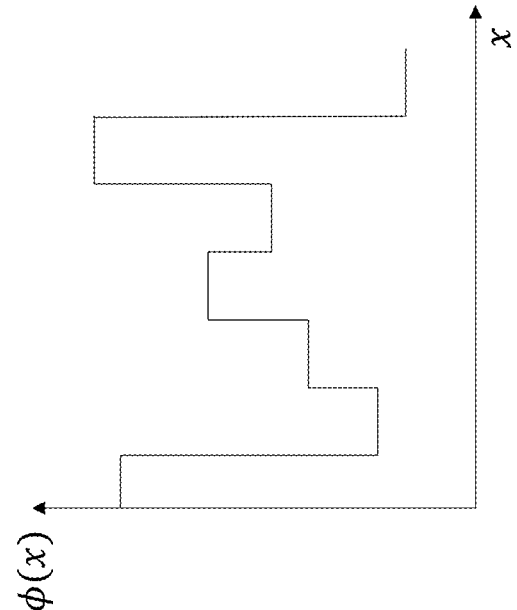
FIG. 6 shows a phase front including discrete jumps.

This ray picture portrays the effect of the facets 10 on an incoming light field which results from a single pixel of the input image. As the field propagates through the LOE, it accumulates discrete jumps in amplitude and phase when impinging (partially impinging) facets 10. The jumps in amplitude are inherent to refractive waveguide technology, and if the reflectivity of the facets 10 is low, their effect on image quality can be neglected. In contrast, the jumps in phase may be substantial, and may have a dramatic effect on image quality of the output image. FIG. 6 shows a simplified image of the phase front of a single light field at the output of the waveguide, under the assumption that diffraction within the waveguide can be neglected.

It is therefore clear that the effect of accumulating different phases when propagating through facets 10 must be controlled, so that high image quality can be achieved. For example, for waveguide structures of 5-20 facets, the phase shift must be smaller than 50° in order to obtain MTF values >0.3 at 10-20 cycles per degree.

Methods for Generating Low-Phase-Shift Optical Coatings

The effect of phase shifts between different optical paths that are induced by the optical coatings can be mitigated with proper coating design. Specifically, the coating design should allow for production of a thin coating with a minimal number of layers, and should meet specific reflection, transmission, achromatic color as function of angle, and now phase shift demands. It was found that using a coating material which has refractive index close to the surrounding immersive glass could be highly beneficial in reducing the overall layer number and coating thickness. Since coating machines are usually limited to just a few materials, it is desired to fabricate a new material with a desired refractive index using a mix of at least two materials. Generally, it could be described that choosing two or three visual optical clear materials and reflection, transmission, color demands a certain inherent phase shift characteristic. These phase shift features can be reduced if at least one of the materials used is in close proximity to the refractive index of the surroundings. If no close proximity refractive index visual optical clear material is available with respect to the ambient glass, then a mix material could be used to reach the needed refractive index.

Using such fabricated materials, the coating induced phase shifts can be mitigated or cancelled out. One method to achieve this is to start with a multi-layer optical coating in an ambient material of refractive index $n_1$, where the optical coating obeys all requirements of a predefined coating specification, except for its induced phase shift, which is higher than desired. This phase shift can be mitigated or cancelled by adding another layer of material with refractive index $n_2$ and thickness d, such that $$d \sim \frac{\lambda_0 \varphi_0 / 2\pi}{\frac{n_2(\lambda_0)}{\cos(\theta_2)} - \frac{n_1(\lambda_0)}{\cos(\theta_1)} + n_1(\lambda_0)\sin(\theta_1)\,[\tan(\theta_1) - \tan(\theta_2)]},$$

where $\varphi_0$ is the phase shift induced by the first coating, which needs to be mitigated (minimized) or cancelled out, $\lambda_0$ is the central wavelength or dominant wavelength in the relevant spectrum, $\theta_1$ is the incident angle of the central field when imping the facet and $\theta_2 = \sin^{-1}[n_2(\lambda_0)\sin(\theta_1)/n1(\lambda_0)]$. If $n_2$ is close in value to $n_1$, the Fresnel reflections caused by this additional layer will be negligible, and therefore the mitigation of induced phase shift is achieved with only mild effects on the performance of the coating in other aspects (e.g., reflectivity and chromaticity).

The thickness d could be selected for a central or dominant wavelength, or could be calculated as the mean or weighted mean of the entire relevant optical spectrum, or as the mean or weighted mean over the entire relevant optical spectrum where the weighting also takes the sensitivity of the human eye into account.

Further, thickness d could be selected for the central field of view, or as a compromise that would minimize phase shift over the entire field of view. For example, the tolerance of thickness d can vary by ±40%, wherein such variation span is by no means exclusive of higher or lower values.

FIG. 7A shows a coating structure of four layers and two materials of refractive indices $n_1 = 1.45$ and $n_2 = 2.1$ that is placed in an ambient material of N-BK7 ($n_0 = 1.515$). FIG. 7B shows the same structure, but with an additional thick layer of $n_3 = 1.5$, which is close in value to the refractive index of the ambient material, $n_3 \lesssim n_0$.

In the equation above the thickness d was determined by considering the central wavelength $\lambda_0$. Of course, other alternatives for determining the thickness d are also possible. For instance, the thickness could be selected for optimal mitigation of the entire relevant spectrum, or for mitigation of green wavelengths, where the human eye is most sensitive.

FIG. 7C compares the phase differences between light propagating through the coating and light that would be transmitted in the ambient material without going through the coating, as a function of incident angle, for s-polarized light at wavelength of $\lambda = 530$ nm, for the structures in FIG. 7A (solid line, shown as "A") and in FIG. 7B (dashed line, shown as "B"). As evident, the structure of FIG. 7A suffers from substantial phase shift, while the structure of FIG. 7B has very low phase shift up to incident angles of ~60°. FIG. 7D compares the reflectivity as a function of incident angle for the structures in FIG. 7A (solid line, shown as "A") and in FIG. 7B (dashed line, shown as "B"). As evident, despite the significant difference in phase shift, the reflectivity profiles are almost identical in the two cases.

More generally, the initial specification could be divided into two separate coating designs that would then be placed one over the other. The first coating is the initial coating that matches all specification requirements, other than the requirements related to coating induced phase shifts; and the second coating is designed to mitigate the coating induced phase shift of the first coating, while maintaining high transmittance, e.g., close to 95% clear transmittance, in all relevant angles. The second coating is expected to affect the coating induced phase shift, while maintaining very low reflectivity. Consequently, the superimposed coating, that is composed of both coating designs together, is likely to satisfy all specification requirements.

Figures 8A, 8B:
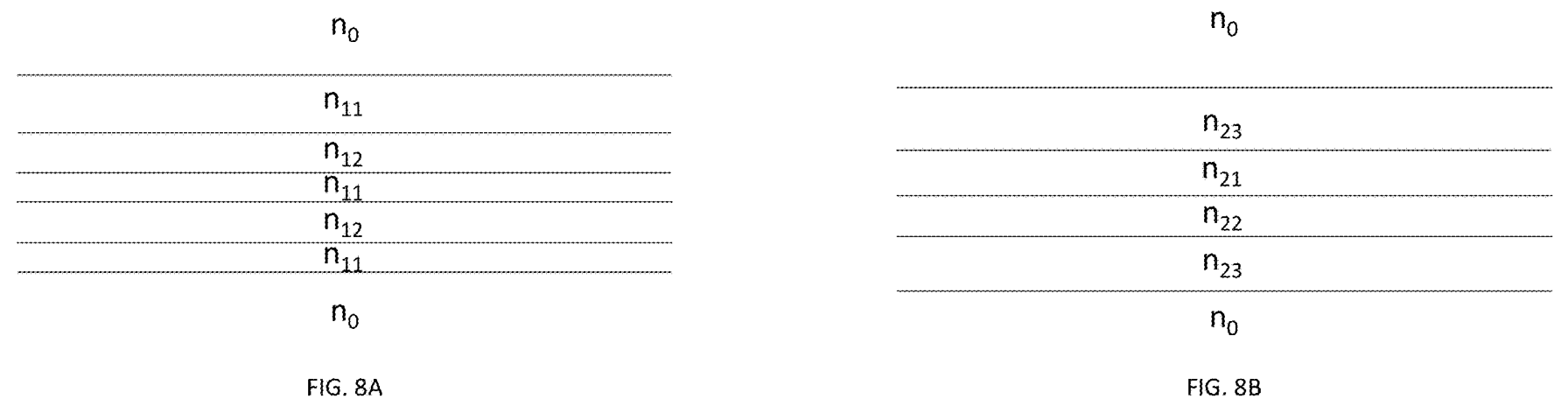
Figure 8C:
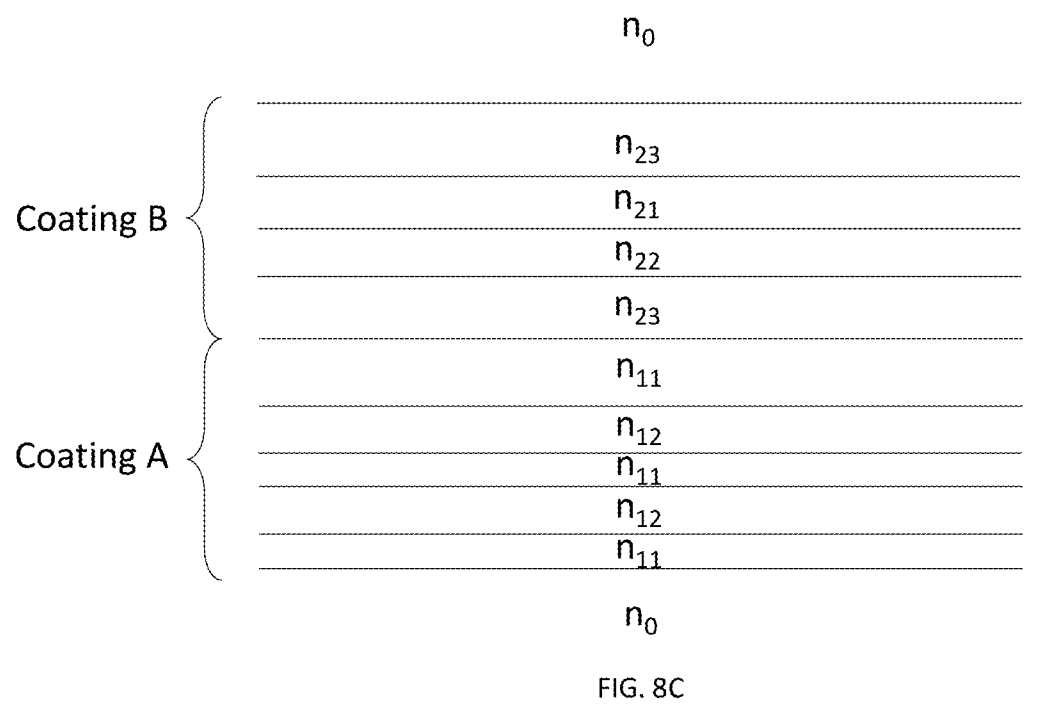

This concept is demonstrated in FIGS. 8A-8C. FIG. 8A shows an exemplary coating structure of two materials of refractive indices $n_{11}$ and $n_{12}$, placed inside an ambient material of refractive index $n_0$. This coating structure is designed for specific requirements that do not include the requirement for low phase shift. FIG. 8B shows an exemplary coating structure of three materials of refractive indices $n_{21}$, $n_{22}$ and $n_{23}$, placed in an ambient material of refractive index $n_0$. This coating structure is designed to have low reflectivity and to induce phase differences that compensate for the phase difference of the structure in FIG. 8A. FIG. 8C shows a combined structure, where the coating structure of FIG. 8B is placed on top of the coating structure of FIG. 8A.

Figure 9:
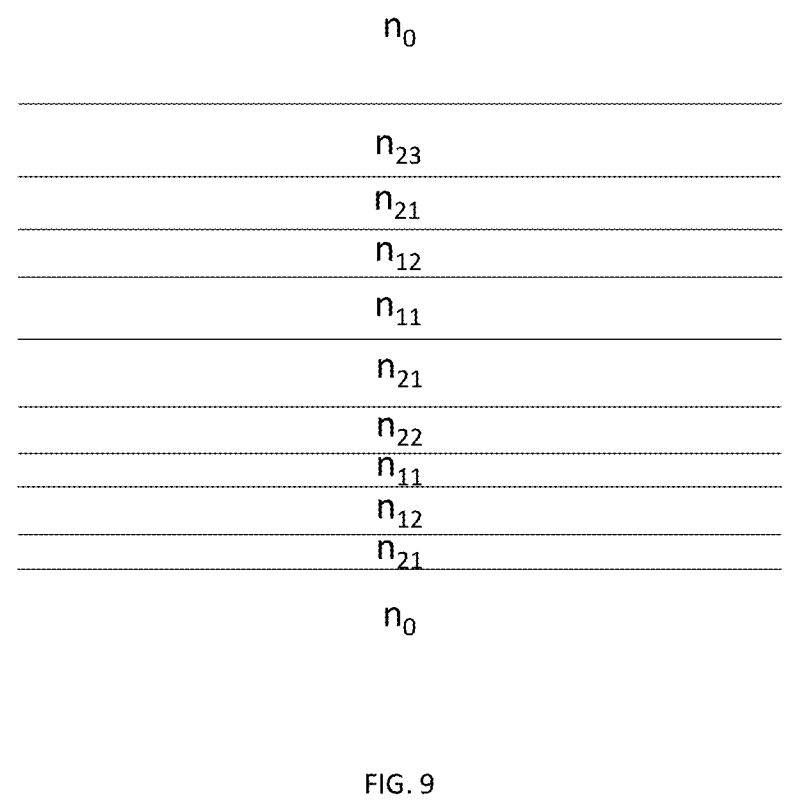

Alternatively, a full optimization of all coating requirements can be carried out for a single coating design. Here a dedicated software program including instructions stored on a non-transitory computer-readable medium would be used to find numerically a stable coating design that would satisfy all coating requirements. In principle, this might be achieved with standard materials; however, it is often advantageous to add fabricated materials to increase the number of degrees of freedom in the design, as explained above. Such a structure is presented in FIG. 9, where materials of different refractive indices $n_{11}$, $n_{12}$, $n_{21}$, $n_{22}$ and $n_{23}$ are placed in an ambient material of refractive index $n_0$. The structure is designed to obey all specification requirements, including low phase shift.

Alternative Possible Applications

Although the present disclosure has focused on techniques for controlling coating induced phase shift in the context of head mount displays, the described techniques can also be used for a wide range of beam expanders for various applications, e.g., for generating broad flat-top beams. Furthermore, the described techniques can also be applied to applications where the coating induced phase is desired, e.g., for generating controlled optical diffusers.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to explain the principles of the invention and the practical application, and to enable others of ordinary skill in the art to understand the invention for various embodiments with various modifications as are suited to the particular use contemplated.

What is claimed is:

1. An apparatus comprising:
a waveguide; and
a plurality of partially reflective surfaces disposed at an angle relative to side-wall surfaces of the waveguide,
wherein each of the partially reflective surfaces comprises a multi-layer coating structure,
wherein a first portion of the multi-layer coating structure comprises one or more first layers configured for optical characteristics causing light that traverses through the one or more first layers at a second incident angle to have an overall phase shift relative to light that traverses through the one or more first layers at a first incident angle, and
wherein a second portion of the multi-layer coating structure comprises one or more second layers configured for optical characteristics selected to decrease the overall phase shift.

2. The apparatus according to claim 1,
wherein the one or more second layers comprise a single second layer with a single refractive index.

3. The apparatus according to claim 2,
wherein the single second layer interfaces with the first portion and an ambient material of the waveguide.

4. The apparatus according to claim 2,
wherein a thickness of the single second layer is greater than a thickness of any of the one or more first layers.

5. The apparatus according to claim 2,
wherein a thickness of the single second layer is based on a central or dominant wavelength to be propagated through the waveguide.

6. The apparatus according to claim 2,
wherein a thickness of the single second layer is based on a central field of view.

7. The apparatus according to claim 2,
wherein a thickness of the single second layer is selected based on a weighted mean of wavelengths to be propagated through the waveguide.

8. The apparatus according to claim 7,
wherein a weighting of the weighted mean is based on a sensitivity of a human eye.

9. The apparatus according to claim 3,
wherein the single refractive index corresponds to a refractive index of the ambient material.

10. The apparatus according to claim 3,
wherein a thickness of the single second layer is selected based on the overall phase shift, a central or dominant wavelength, an incident angle, a refractive index of the ambient material, and a refractive index of the single second layer.

11. The apparatus according to claim 1,
wherein the one or more second layers comprise a plurality of second layers with respective refractive indexes.

12. The apparatus according to claim 11,
wherein the plurality of second layers are configured to have 95% or greater transmittance.

13. The apparatus according to claim 11,
wherein the plurality of second layers comprises at least three refractive indexes.

14. The apparatus according claim 11,
wherein the plurality of second layers comprises an even number of layers.

15. The apparatus according to claim 1,
wherein the one or more first layers are interleaved with the one or more second layers.

16. An apparatus comprising:
a waveguide; and
a plurality of partially reflective surfaces disposed at an angle relative to side-wall surfaces of the waveguide,
wherein each of the partially reflective surfaces comprises a multi-layer coating structure, and
wherein one or more layers of the multi-layer coating structure is selected to limit an overall phase shift of light that traverses through the multi-layer coating structure at a second incident angle, relative to light that traverses through the multi-layer coating structure at a first incident angle, to below a predetermined threshold.

17. The apparatus according to claim 16,
wherein one or more other layers of the multi-layer coating structure are selected to satisfy a plurality of optical properties other than phase shift.

18. The apparatus according to claim 17,
wherein the plurality of optical properties other than phase shift include limiting an overall phase shift of light propagating through a distance in the multi-layer coating structure relative to the distance in an ambient material of the waveguide.

19. The apparatus according to claim 16,
wherein the one or more layers comprises a single layer with a thickness based on a central or dominant wavelength to be propagated through the waveguide.

20. The apparatus according to claim 16,
wherein the one or more layers comprises a single layer with a thickness based on a weighted mean of wavelengths to be propagated through the waveguide.

21. The apparatus according to claim 20,
wherein a weighting of the weighted mean is based on a sensitivity of a human eye.

* * * * *